US012754601B2

(12) United States Patent
Kushnir et al.

(10) Patent No.: US 12,754,601 B2
(45) Date of Patent: Oct. 6, 2026

(54) POWER MANAGEMENT OF CHIPLETS WITH VARYING PERFORMANCE

(71) Applicants: Advanced Micro Devices, Inc., Santa Clara, CA (US); ATI Technologies ULC, Markham (CA)

(72) Inventors: Stephen Kushnir, Markham (CA); Sriram Sundaram, Austin, TX (US); Christopher Allan Poirier, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 18/065,313

(22) Filed: Dec. 13, 2022

(65) Prior Publication Data

US 2024/0192759 A1 Jun. 13, 2024

(51) Int. Cl.
*G06F 1/32* (2019.01)
*G06F 1/3228* (2019.01)
*G06F 1/3296* (2019.01)

(52) U.S. Cl.
CPC .......... *G06F 1/3296* (2013.01); *G06F 1/3228* (2013.01)

(58) Field of Classification Search
CPC ............................. G06F 1/3296; G06F 1/3228
See application file for complete search history.

(56) References Cited

U.S. PATENT DOCUMENTS 4,980,836 A 12/1990 Carter et al.
5,396,635 A 3/1995 Fung
5,617,572 A 4/1997 Pearce et al.
5,692,202 A 11/1997 Kardach et al.
6,334,167 B1 12/2001 Gerchman et al.
6,657,534 B1 12/2003 Beer et al.
6,657,634 B1 12/2003 Sinclair et al.
7,028,200 B2 4/2006 Ma
(Continued)

OTHER PUBLICATIONS

International Search Report and Written Opinion in International Application No. PCT/US2018/051789, mailed Jan. 2, 2019, 14 pages.

(Continued)

*Primary Examiner* — Stefan Stoynov

(74) *Attorney, Agent, or Firm* — Kowert, Hood, Munyon, Rankin & Goetzel, P.C.; Rory D. Rankin

(57) ABSTRACT

An apparatus and method for efficiently managing performance among replicated modules of an integrated circuit despite manufacturing variations across semiconductor dies. An integrated circuit includes a first module with a first partition of multiple dies that share at least a same first power rail. The integrated circuit also includes a second module with a second partition of multiple dies that share at least a same second power rail different from the first power rail. The dies within partitions have differences in circuit parameters within a threshold such that the dies can be placed in a same first bin. The dies in different partitions belong to different bins. A power manager initially assigns the same operating parameters to the first partition and the second partition, but adjusts the operating parameters based on detection of the different circuit behavior due to manufacturing variations between the first partition and the second partition.

20 Claims, 9 Drawing Sheets

(56) References Cited

U.S. PATENT DOCUMENTS

| | | | |
|---|---|---|---|
| 7,085,941 | B2 | 8/2006 | Li |
| 7,394,288 | B1 | 7/2008 | Agarwal |
| 7,428,644 | B2 | 9/2008 | Jeddeloh et al. |
| 7,437,579 | B2 | 10/2008 | Jeddeloh et al. |
| 7,496,777 | B2 | 2/2009 | Kapil |
| 7,613,941 | B2 | 11/2009 | Samson et al. |
| 7,743,267 | B2 | 6/2010 | Snyder et al. |
| 7,800,621 | B2 | 9/2010 | Fry |
| 7,802,060 | B2 | 9/2010 | Hildebrand |
| 7,840,827 | B2 | 11/2010 | Dahan et al. |
| 7,868,479 | B2 | 1/2011 | Subramaniam |
| 7,873,850 | B2 | 1/2011 | Cepulis et al. |
| 7,899,990 | B2 | 3/2011 | Moll et al. |
| 8,181,046 | B2 | 5/2012 | Marcu et al. |
| 8,402,232 | B2 | 3/2013 | Avudaiyappan et al. |
| 8,438,416 | B2 | 5/2013 | Kocev et al. |
| 8,656,198 | B2 | 2/2014 | Branover et al. |
| 8,924,758 | B2 | 12/2014 | Steinman et al. |
| 8,949,644 | B2 | 2/2015 | Ma et al. |
| 9,563,257 | B2 | 2/2017 | Fang et al. |
| 9,983,652 | B2 | 5/2018 | Piga et al. |
| 10,671,148 | B2 | 6/2020 | Tsien et al. |
| 2004/0015628 | A1 | 1/2004 | Glasco et al. |
| 2006/0271649 | A1 | 11/2006 | Tseng et al. |
| 2008/0288798 | A1 | 11/2008 | Cooper et al. |
| 2009/0235105 | A1 | 9/2009 | Branover et al. |
| 2010/0106876 | A1 | 4/2010 | Nakahashi et al. |
| 2011/0083023 | A1 | 4/2011 | Dickens et al. |
| 2011/0153924 | A1 | 6/2011 | Vash et al. |
| 2011/0264934 | A1 | 10/2011 | Branover et al. |
| 2012/0254526 | A1 | 10/2012 | Kalyanasundharam |
| 2013/0007483 | A1 | 1/2013 | Diefenbaugh et al. |
| 2013/0132755 | A1 | 5/2013 | Cooper et al. |
| 2013/0179621 | A1 | 7/2013 | Smith et al. |
| 2013/0311804 | A1 | 11/2013 | Garg et al. |
| 2013/0332764 | A1 | 12/2013 | Juang et al. |
| 2014/0095801 | A1 | 4/2014 | Bodas et al. |
| 2014/0122833 | A1 | 5/2014 | Davis et al. |
| 2014/0281275 | A1 | 9/2014 | Kruckemyer et al. |
| 2015/0067356 | A1* | 3/2015 | Trichy Ravi ............ G06F 1/324 713/300 |
| 2015/0185814 | A1* | 7/2015 | Ping ........................ G06F 1/206 713/323 |
| 2016/0147285 | A1 | 5/2016 | Alshinnawi et al. |
| 2016/0179173 | A1* | 6/2016 | Eastep .................. G06F 1/3234 713/320 |
| 2016/0314024 | A1 | 10/2016 | Chang et al. |
| 2017/0310492 | A1 | 10/2017 | Wang |
| 2017/0353926 | A1 | 12/2017 | Zhu et al. |
| 2018/0081420 | A1 | 3/2018 | Jones et al. |
| 2018/0157311 | A1 | 6/2018 | Maisuria et al. |
| 2018/0188797 | A1 | 7/2018 | Wang et al. |
| 2019/0204899 | A1 | 7/2019 | Tsien et al. |
| 2019/0377395 | A1* | 12/2019 | Kaburlasos ............... G06F 1/28 |
| 2021/0405722 | A1 | 12/2021 | Sadowski et al. |
| 2022/0091657 | A1 | 3/2022 | Tsien |

OTHER PUBLICATIONS

International Search Report and Written Opinion in International Application No. PCT/US2018/051916, mailed Jan. 31, 2019, 10 pages.

Yuan et al., “Buffering Approach for Energy Saving in Video Sensors”, 2003 International Conference on Multimedia and Expo, Jul. 2003, 4 pages.

“Intel Power Management Technologies for Processor Graphics, Display, and Memory: White Paper for 2010-2011 Desktop and Notebook Platforms”, Intel Corporation, Aug. 2010, 10 pages.

Invitation to Pay Additional Fees, Communication Relating to the Results of the Partial International Search and Provisional Opinion Accompanying the Partial Search Result in International Application No. PCT/US2021/051814, mailed Dec. 21, 2021, 15 pages.

Li et al., “Compiler-Directed Proactive Power Management for Networks”, CASES ’05: Proceedings of the 2005 International Conference on Compilers, Architectures and Synthesis for Embedded Systems, Sep. 24, 2005, pp. 137-146.

International Search Report and Written Opinion in International Application No. PCT/US2021/051814, mailed Apr. 4, 2022, 20 pages.

* cited by examiner

POWER MANAGEMENT OF CHIPLETS WITH VARYING PERFORMANCE

BACKGROUND

Description of the Relevant Art

Generally speaking, a variety of semiconductor chips include at least one processing unit coupled to a memory. The processing unit processes instructions (or commands) by fetching instructions and data, decoding instructions, executing instructions, and storing results. The processing unit sends memory access requests to the memory for fetching instructions, fetching data, and storing results of computations. Examples of the processing unit are a central processing unit (CPU), an application specific integrated circuit (ASIC), a field programmable gate array (FPGA), a multimedia engine, and a processing unit with a highly parallel microarchitecture such as a graphics processing unit (GPU) or a digital signa processor (DSP). In some designs, the processing unit, one or more other integrated circuits, and the memory are on a same die such as a system-on-a-chip (SOC), whereas, in other designs, the processing unit and the memory are on different dies within a same package such as a system in a package (SiP) or a multi-chip-module (MCM).

During the semiconductor manufacturing process steps for the semiconductor die, and prior to packaging the semiconductor die in the MCM or other semiconductor package, it is possible that one or more processing units and other functional blocks on the semiconductor die have different circuit behavior than other iterations of the semiconductor die in another semiconductor package. These differences in behavior result from manufacturing variations across semiconductor dies that inadvertently cause different widths of metal gated and metal traces, different doping levels of source and drain regions, different thicknesses of insulating oxide layers, different thicknesses of metal layers, and so on. These manufacturing variations also affect the threshold voltages of transistors. The semiconductor dies with different circuit behavior are still used, but these semiconductor dies are placed in different performance categories or bins. When the semiconductor package utilizes multiple copies of a same semiconductor die and even when the multiple copies receive a same workload, the behavior of the resulting semiconductor chip can vary depending on which bins the semiconductor dies were selected to be placed in the semiconductor chip.

In view of the above, efficient methods and apparatuses for managing power consumption and performance among replicated semiconductor dies of an integrated circuit despite different circuit behavior due to manufacturing variations are desired.

Figure 1:
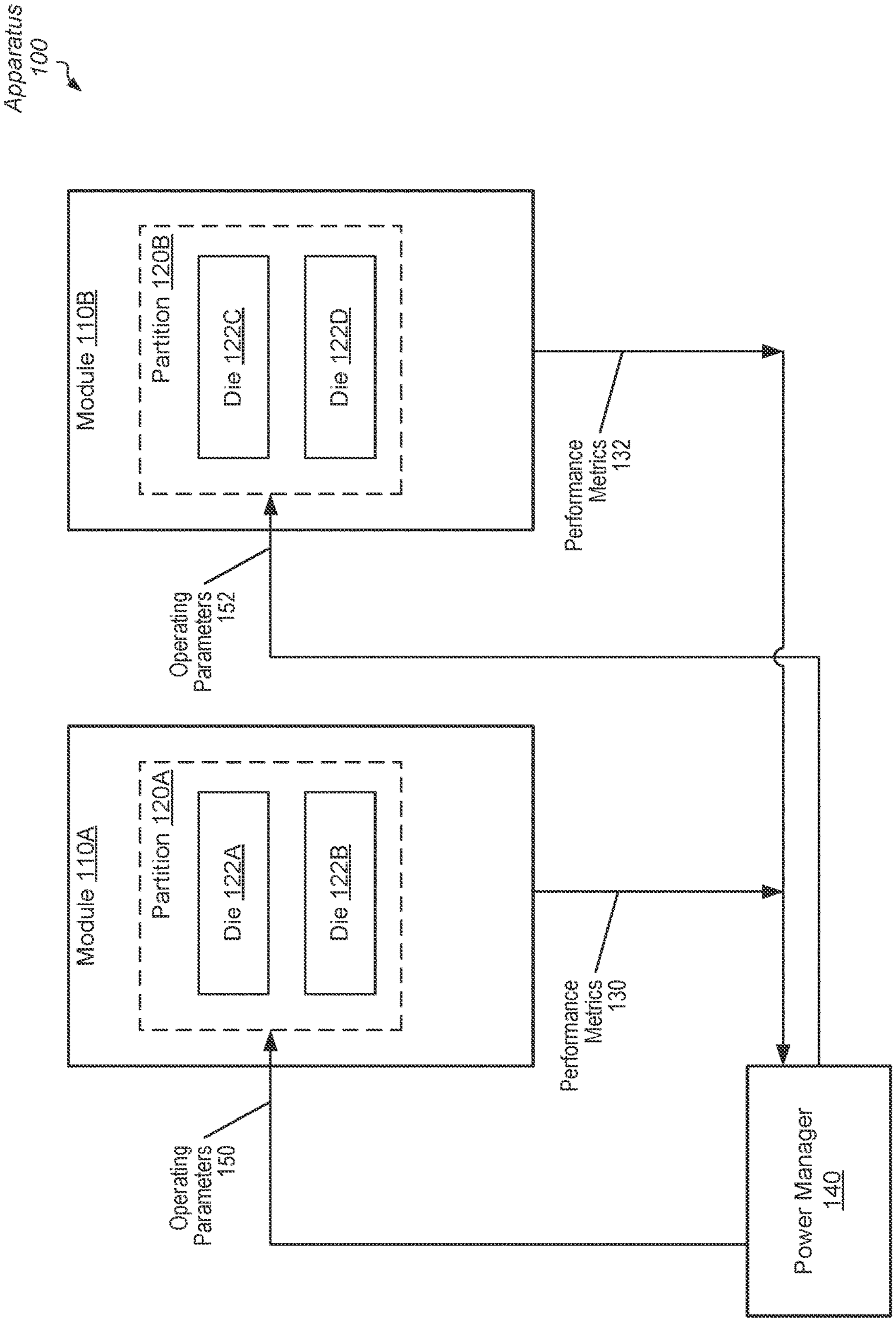
FIG. 1 is a generalized block diagram of an apparatus that manages power consumption and performance among replicated modules of an integrated circuit.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods efficiently managing balanced performance among replicated modules of an integrated circuit are contemplated. In various implementations, an integrated circuit includes a first module with a first partition of multiple dies that share at least a same first power rail. The integrated circuit also includes a second module with a second partition of multiple dies that share at least a same second power rail different from the first power rail. The dies of the first partition have differences in circuit parameters within a threshold such that the dies can be placed (or categorized) in a same first bin. The dies of the second partition have differences in circuit parameters within a threshold such that the dies can be placed (or categorized) in a same second bin different from the first bin. However, it is possible that the first partition and the second partition provide different circuit behavior due to manufacturing variations between the first partition of dies of the first bin and the second partition of dies of the second bin. The first partition is placed within a first module of an integrated circuit, and the second partition is placed within a second module of an integrated circuit.

A power manager initially assigns (or allocates) a same power budget to each of the first module and the second module. However, the power manager adjusts the power budgets such that the first module and the second module have different power budgets based on detection of the different circuit behavior due to manufacturing variations between the first partition and the second partition. Therefore, the power manager assigns the same operating parameters, such as operating power supply voltage level and operating clock frequency, to the dies of the first partition of the first module and the dies of the second partition of the second module. However, the power manager adjusts the operating parameters to different values based on detection of the different circuit behavior due to manufacturing variations between the dies of first partition and the dies of the second partition.

Referring to FIG. 1, a generalized block diagram is shown of an apparatus 100 that manages performance among replicated modules of an integrated circuit. In the illustrated implementation, the apparatus 100 includes the power manager 140 and at least two modules, such as modules 110A-110B, which include circuitry configured to perform (or "execute") tasks (e.g., based on execution of instructions, detection of signals, movement of data, generation of signals and/or data, and so on). The module 110A includes the partition 120A that includes the semiconductor dies 122A-122B (or dies 122A-122B). The module 110B includes the partition 120B that includes the dies 122C-122D. Each of the modules 110A-11B is assigned a respective power domain by the power manager 140. Each of the power domains includes at least operating parameters such as at least an operating power supply voltage and an operating clock frequency. Each of the power domains also includes control signals for enabling and disabling connections to clock generating circuitry and a power supply reference. Therefore, the module 110A is connected to a power rail separate from a power rail used by the module 110B. By being connected to separate power rails, the module 110A and module 110B can use separate power domains. Although only two modules 110A-110B are shown, other numbers of modules used by apparatus 100 are possible and contemplated and the number is based on design requirements.

Other components of the apparatus 100 are not shown for ease of illustration. For example, a memory controller, one or more input/output (I/O) interface units, interrupt controllers, one or more phased locked loops (PLLs) or other clock generating circuitry, one or more levels of a cache memory subsystem, and a variety of other functional blocks are not shown although they can be used by the apparatus 100. In various implementations, the apparatus 100 is used in a desktop, a portable computer, a mobile device, a server, a peripheral device, or other. The apparatus 100 is capable of communicating with an external general-purpose central processing unit (CPU) that includes circuitry for executing instructions according to a predefined general-purpose instruction set architecture (ISA). The apparatus 100 is also capable of communicating with a variety of other external circuitry such as one or more of a digital signal processor (DSP), a display controller, a variety of application specific integrated circuits (ASICs), a multimedia engine, and so forth.

In some implementations, the functionality of the apparatus 100 is included as one die of multiple dies on a system-on-a-chip (SOC). In other implementations, the functionality of the apparatus 100 is implemented by multiple, separate dies that have been fabricated on separate silicon wafers and placed in system packaging known as multi-chip modules (MCMs). As used herein, a "chiplet" is also referred to as a "functional block," or an "intellectual property block" (or IP block). However, a "chiplet" is a semiconductor die (or die) fabricated separately from other dies, and then interconnected with these other dies in a single integrated circuit in the MCM. A chiplet is a type of functional block. However, a functional block is a term that also describes blocks fabricated with other functional blocks on a larger semiconductor die such as the SoC. Therefore, a chiplet is a subset of "functional blocks" in a semiconductor chip. On a single silicon wafer, only multiple chiplets are fabricated as multiple instantiated copies of particular integrated circuitry, rather than fabricated with other functional blocks that do not use an instantiated copy of the particular integrated circuitry. For example, the chiplets are not fabricated on a silicon wafer with various other functional blocks and processing units on a larger semiconductor die such as an SoC. A first silicon wafer (or first wafer) is fabricated with multiple instantiated copies of integrated circuitry a first chiplet, and this first wafer is diced using laser cutting techniques to separate the multiple copies of the first chiplet.

A second silicon wafer (or second wafer) is fabricated with multiple instantiated copies of integrated circuitry of a second chiplet, and this second wafer is diced using laser cutting techniques to separate the multiple copies of the second chiplet. The first chiplet provides functionality different from the functionality of the second chiplet. One or more copies of the first chiplet is placed in an integrated circuit, and one or more copies of the second chiplet is placed in the integrated circuit. The first chiplet and the second chiplet are interconnected to one another within a corresponding MCM. Such a process replaces a process that fabricates a third silicon wafer (or third wafer) with multiple copies of a single, monolithic semiconductor die that includes the functionality of the first chiplet and the second chiplet as integrated functional blocks within the single, monolithic semiconductor die.

Process yield of single, monolithic dies on a silicon wafer is lower than process yield of smaller chiplets on a separate silicon wafer. In addition, a semiconductor process can be adapted for the particular type of chiplet being fabricated. With single, monolithic dies, each die on the wafer is formed with the same fabrication process. However, it is possible that an interface functional block does not require process parameters of a semiconductor manufacturer's expensive process that provides the fastest devices and smallest geometric dimensions that are beneficial for a high throughput processing unit on the die. With separate chiplets, designers can add or remove chiplets for particular integrated circuits to readily create products for a variety of performance categories. In contrast, an entire new silicon wafer must be fabricated for a different product when single, monolithic dies are used.

The following description of FIGS. 1-9 describes techniques for managing power consumption and performance both for multiple functional blocks placed in an SoC and for multiple chiplets placed in an MCM. In the case of using an MCM, one or more of the chiplets are connected to separate power rails, and therefore, can use separate power domains. Similarly, in the case of using an SoC, one or more of the functional blocks are connected to separate power rails, and therefore, can use separate power domains. The power manager 140 controls the values of power supply reference levels placed on these power rails. The power manager 140 decreases (or increases) power consumption if apparatus 100 is operating above (below) a threshold limit.

In some implementations, power manager 140 selects a respective power management state for each of the modules 110A-110B. As used herein, a "power management state" is one of multiple "P-states," or one of multiple power-performance states that include a set of operational parameters such as an operational clock frequency and an operational power supply voltage. In various implementations, the apparatus 100 uses a parallel data micro-architecture that provides high instruction throughput for a computationally intensive task. In one implementation, each of the semiconductor dies 122A-122D (or dies 122A-122D) uses one or more processor cores with a relatively wide single instruction multiple data (SIMD) micro-architecture to achieve high throughput in highly data parallel applications. Each object is processed independently of other objects, but the same sequence of operations is used.

In one implementation, each of the dies 122A-122D is a graphics processing unit (GPU). Modern GPUs are efficient for data parallel computing found within loops of applications, such as in applications for manipulating and displaying computer graphics, molecular dynamics simulations, finance computations, and so forth. The highly parallel structure of GPUs makes them more effective than general-purpose central processing units (CPUs) for a range of complex algorithms. The high parallelism offered by the hardware of the compute units of GPUs is used for simultaneously rendering multiple pixels, but it is also capable of simultaneously processing the multiple data elements of the scientific, medical, finance, encryption/decryption and other computations. For example, the modules 110A-110B can be used for real-time data processing tasks such as rendering pixels, image blending, pixel shading, vertex shading, and geometry shading. In other implementations, the modules 110A-110B provide other types of functionalities. In various implementations, module 110B includes the same components as module 110A, since modules 110A-110B represent instantiated copies of integrated circuitry within the apparatus 100. These modules, 110A-110B, process tasks of the same type within a same workload. In an implementation, the modules 110A-110B may both process pixel rendering tasks of a video graphics workload, where pixel rendering tasks are considered tasks of a same type.

Module 110A receives operating parameters 150 of a first power domain from power manager 140, and the dies 122A-122B execute tasks using the operational parameters 150. The module 110B receives operating parameters 152 of a second power domain from power manager 140. It is possible and contemplated that the first power domain and the second power domain are different power domains. Therefore, the power manager 140 is able to dynamically adjust the power domains at the granularity of a module, such as modules 110A and 110B, rather than at the granularity of the entire apparatus 100. In some implementations, the power manager 140 is an integrated controller as shown, whereas, in other implementations, the power manager 140 is located externally from the apparatus 100.

In various implementations, the power manager 140 receives the performance metrics 130 from module 110A and performance metrics 132 from module 110B. These performance metrics 130 and 132 are values stored in performance counters across the dies 122A-122B and dies 122C-122D. These performance counters can also be distributed across other components (not shown) of the modules 110A and 110B. In some implementations, the collected data includes predetermined sampled signals. The switching of the sampled signals indicates an amount of switched capacitance. Examples of the selected signals to sample include clock gater/gating enable signals, bus driver enable signals, mismatches in content-addressable memories (CAM), CAM word-line (WL) drivers, and so forth. The collected data can also include data that indicates throughput of each of the modules 110A and 110B such as a number of retired instructions, a number of cache accesses, monitored latencies of cache accesses, a number of cache hits, a count of issued instructions or issued threads, and so forth. In an implementation, the power manager 140 collects data to characterize power consumption and a performance level of the modules 110A and 110B during particular sample intervals. The performance levels are based on one or more of the examples of the collected data.

Despite being instantiated copies, it is possible that the module 110A has different circuit behavior than module 110B. These differences in circuit behavior result from manufacturing variations across semiconductor dies that inadvertently cause different widths of metal gate and metal traces, different doping levels of source and drain regions, different thicknesses of insulating oxide layers, different thicknesses of metal layers, and so on. These manufacturing variations also affect the threshold voltages of transistors. Additionally, these manufacturing variations also affect the minimum power supply voltage for dies 122A-122B and dies 122C-122D. For a particular die of dies 122A-122D, its minimum power supply voltage is the smallest value of the power supply voltage that can be provided to circuitry without functional failure such as loss of a Boolean logic high value on a data storage node. The differences in these voltages, the above parameters, and other parameters between module 110A and module 110B can be greater than a particular threshold, which cause noticeable differences in performance levels and power consumption between module 110A and module 110B despite processing the same type of tasks within the same workload. In an implementation, the modules 110A-110B perform geometry shading tasks in a video graphics workload, where geometry shading tasks are considered tasks of the same type.

To maintain high performance, dies of the dies 122A-122D that share operating parameters (e.g., such as being connected to a same power rail) will ideally come from a same bin where dies have similar circuit behavior within one or more thresholds. Similarly, dies 122C-122D should come from a same bin. However, this may not be the case and the dies 122A-122B can come from a different bin than a bin of the dies 122C-122D. Consequently, the power manager 140 is able to dynamically adjust the power domains and corresponding operating parameters 150 and 152 of the modules 110A and 110B based on a difference in performance levels of the modules 110A and 110B. The power manager 140 determines the difference in performance levels by comparing the performance levels of the modules 110A and 110B. The performance levels of the modules 110A and 110B are based on the performance metrics 130 and 132 monitored during the processing of a workload.

In an example, the power manager 140 receives a power budget of 400 watts (W) for the apparatus 100. The power budget can also be represented as a number of power credits or other value. The power manager 140 initially assigns (or initially allocates) a same budget of 200 W to each of the modules 110A and 110B, and assigns the same corresponding values for the operating parameters 150 and 152. After a time interval, the power manager 140 receives updated values of the performance metrics 130 and 132 in addition to an indication of the workload for the modules 110A and 110B. In an implementation, the indication of the workload can come from another processing unit executing instructions of an operating system. From the performance metrics 130 and 132, the power manager 140 determines each of the modules 110A and 110B consumes 150 W. Based on the indication of the workload and control circuitry processing the steps of a power management algorithm, the power manager 140 can either maintain the current values of the operating parameters 150 and 152, or update them. For example, the power manager 140 reallocates the power budget among the modules 110A and 110B based on the performance metrics 130 and 132.

In some implementations, the power manager 140 determines performance levels of the modules 110A and 110B based on the updated values of the performance metrics 130 and 132. The power manager 140 compares the performance levels of the modules 110A and 110B, and based on the difference of the updated performance levels, the power manager 140 reallocates the power budget among the modules 110A and 110B. For example, the power manager 140, based on the updated performance levels, can either maintain the current values of the operating parameters 150 and 152, or update them. After another time interval, the power manager 140 determines each of the modules 110A and 110B consumes 180 W. The power manager 140 can either maintain the current values of the operating parameters 150 and 152, or update them in a similar manner. In some implementations, the power manager 140 updates the performance levels of the modules 110A and 110B based on the updated values of the performance metrics 130 and 132 received after another time interval. The power manager 140 compares the updated performance levels of the modules 110A and 110B, and based on the difference of the updated performance levels, the power manager 140 reallocates the power budget among the modules 110A and 110B.

After yet another time interval, the power manager 140 determines the module 110A consumes 200 W, whereas, the module 110B consumes 195 W. Despite processing a same type of tasks of a same workload, the module 110B consumes less power than the module 110A. It is possible that the module 110B has a minimum power supply voltage less than a minimum power supply voltage of the module 110A. It is also possible that other parameter differences cause the module 110B to consume less power than module 110A. In response, the power manager assigns a power budget of 205 W to module 110A and a power budget of 195 W to module 110B. The power manager 140 sends values of operating parameters 150 and 152 corresponding to these new power budgets, which satisfy the total power budget.

In some implementations, after the total power budget is satisfied, the power manager 140 or another functional block (not shown) determines whether the module 110A and module 110B provide performance levels within a performance threshold of one another. A measured throughput, a measured rate of a number of instructions retired, or other measurement is used to measure performance levels. After comparing the updated performance levels of the module 110A and module 110B, if the performance levels vary by more than the performance threshold, then the power manger 140 reallocates the power budget among the modules 110A and 110B. For example, the power manger 140 adjusts the new operating parameters in a manner to equate the separate performance levels. After it is determined that an adjustment is required, the power manager 140 assigns a power budget of 208 W to module 110A and a power budget of 192 W to module 110B. The power manager 140 sends values of operating parameters 150 and 152 corresponding to these new power budgets, which satisfy the total power budget. After a particular time interval (or period of time) elapses, the power consumption and the performance of the module 110A and the module 110B are again checked.

Figure 2:
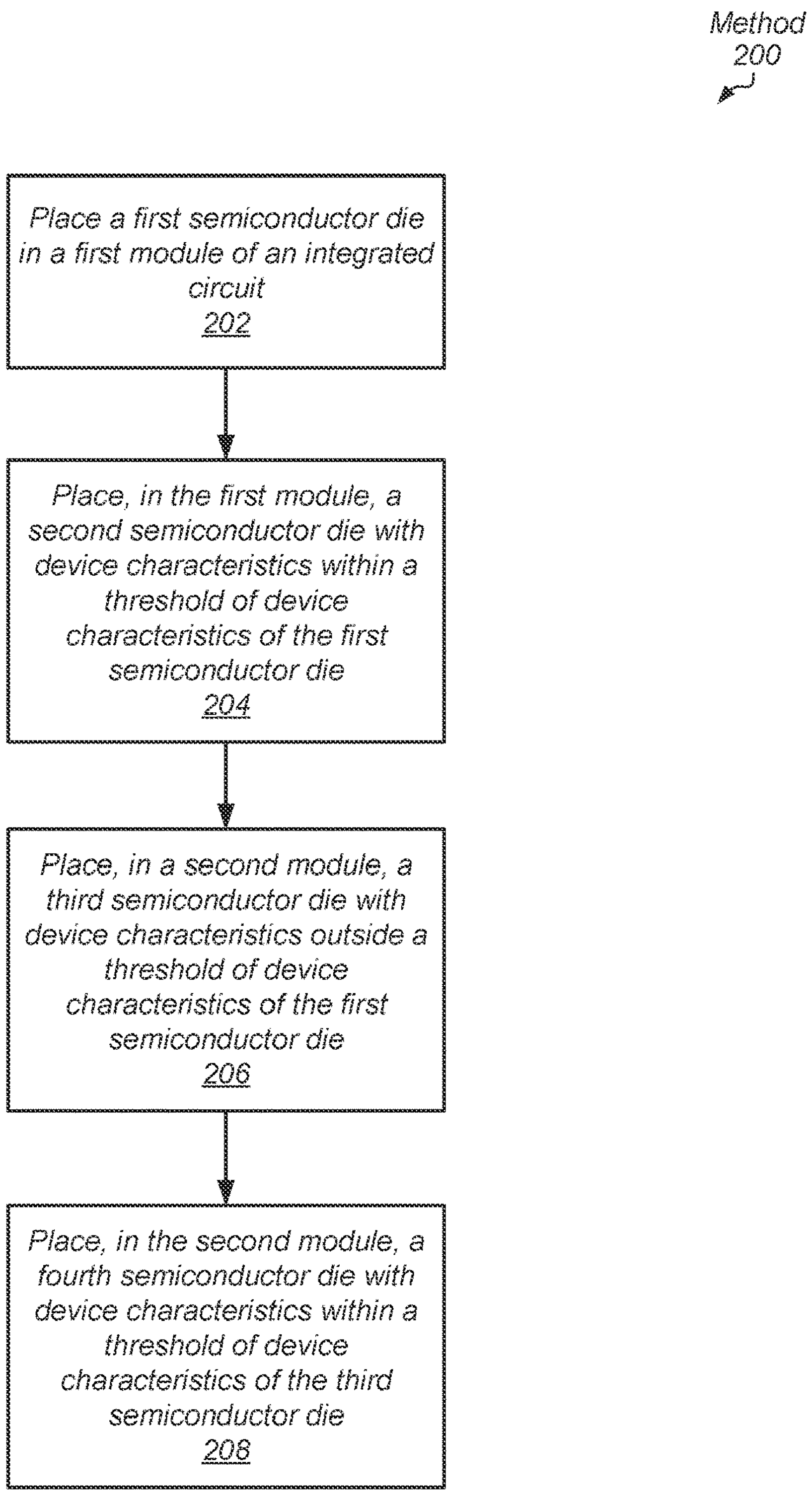
FIG. 2 is a generalized diagram of a method for efficiently managing power consumption and performance among replicated modules of an integrated circuit.

Referring to FIG. 2, a generalized block diagram is shown of a method 200 for efficiently managing performance among replicated modules of an integrated circuit despite different circuit behavior due to manufacturing variations. For purposes of discussion, the steps in this implementation (as well as in FIGS. 3-4 and 6) are shown in sequential order. However, in other implementations some steps occur in a different order than shown, some steps are performed concurrently, some steps are combined with other steps, and some steps are absent.

An integrated circuit being fabricated includes at least two modules. A first module includes multiple dies in a same first partition where these dies are operable to use a same power domain. Therefore, the multiple dies share at least a same first power rail. Similarly, the second module includes multiple dies in a same second partition operable to use a same power domain. The multiple dies of the second module share at least a same second power rail different from the first power rail. A first semiconductor die is placed in the first module of an integrated circuit (block 202).

A second semiconductor die with device characteristics within a threshold of device characteristics of the first semiconductor die is placed in the first module (block 204). Examples of the device (transistor) characteristics are widths of metal gated and metal traces, doping levels of source and drain regions, thicknesses of insulating oxide layers, thicknesses of metal layers, values of a minimum power supply voltage, values of threshold voltages of n-type transistors and p-type transistors, and so on. A third semiconductor die with device characteristics outside a threshold of device characteristics of the first semiconductor die is placed in a second module (block 206). A fourth semiconductor die with device characteristics within a threshold of device characteristics of the third semiconductor die is placed in the second module (block 208). Therefore, each of the modules includes dies with similar device characteristics, and these dies are highly likely from a same bin. Across modules, though, the dies can be from different bins.

Figure 3:
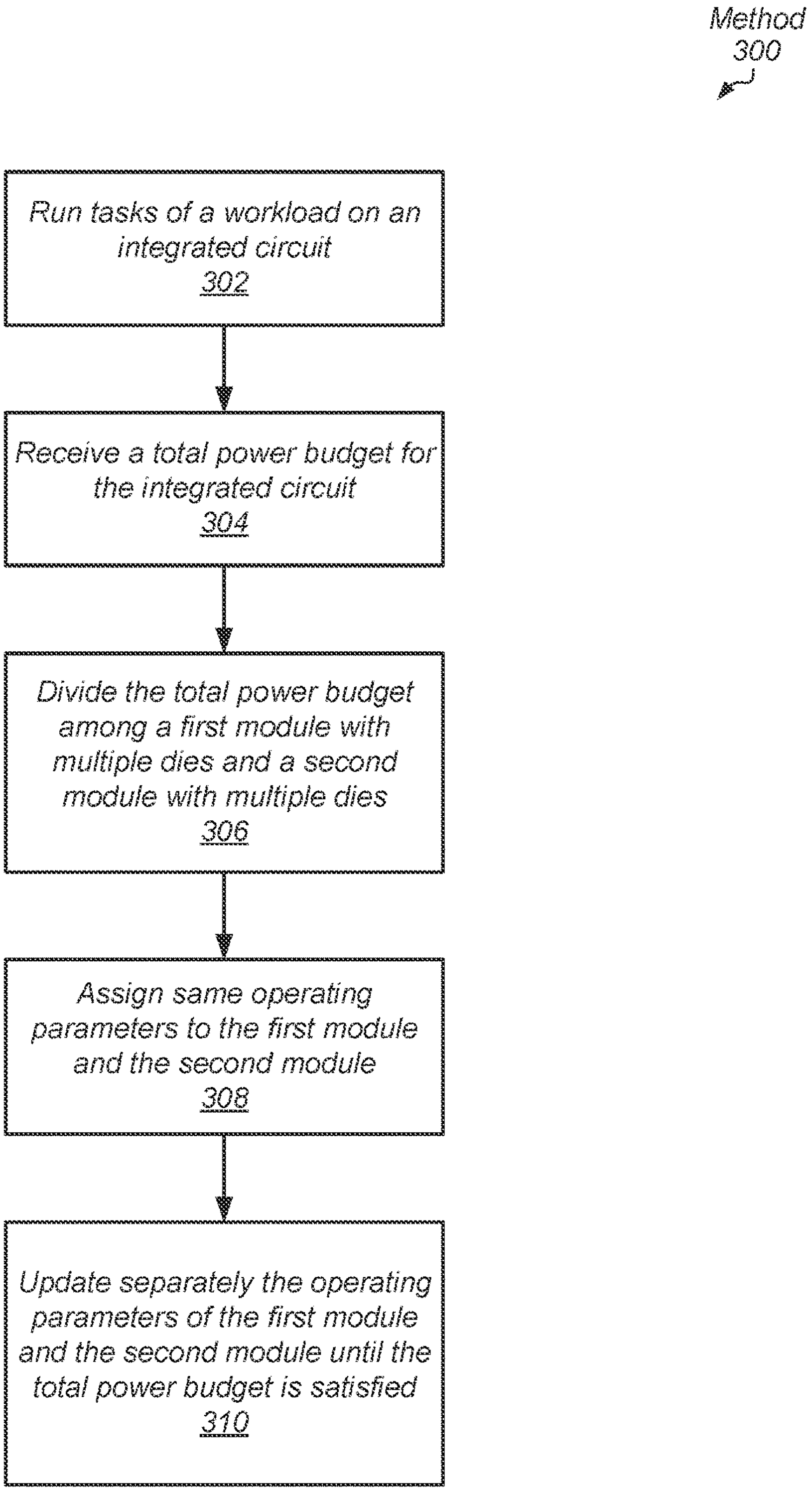
FIG. 3 is a generalized block diagram of a method for efficiently managing power consumption and performance among replicated modules of an integrated circuit.

Turning now to FIG. 3, a generalized block diagram is shown of a method 300 for efficiently managing performance among replicated modules of an integrated circuit despite different circuit behavior due to manufacturing variations. Tasks of a workload are run on an integrated circuit (block 302). A power manager receives a total power budget for the integrated circuit (block 304). The power manager, such as circuitry, allocates (e.g., divides) the total power budget among a first module with multiple dies and a second module with multiple dies (block 306). Both the first module and the second module executes tasks of the same type within a same workload. For example, the first module and the second module may each perform image blending tasks as part of a video graphics processing workload, where image blending tasks are considered tasks of a same type. The power manager assigns the same operating parameters to the first module and the second module based on the allocated power budgets (block 308).

The power manager separately updates the operating parameters of the first module and the second module until the total power budget is satisfied (block 310). In some implementations, after the total power budget is satisfied, the power manager or another functional block determines whether replicated modules are providing performance levels within a performance threshold of one another. A measured throughput, a measured rate of a number of instructions retired, or other measurement is used to measure performance levels. If the performance levels vary by more than the performance threshold, then the power manger receives an indication (or determines the indication) to adjust the new operating parameters in a manner to equate the separate performance levels. After a particular time interval (or period of time) elapses, the power consumption, and the performance levels of the first module and the second module are again checked.

Figure 4:
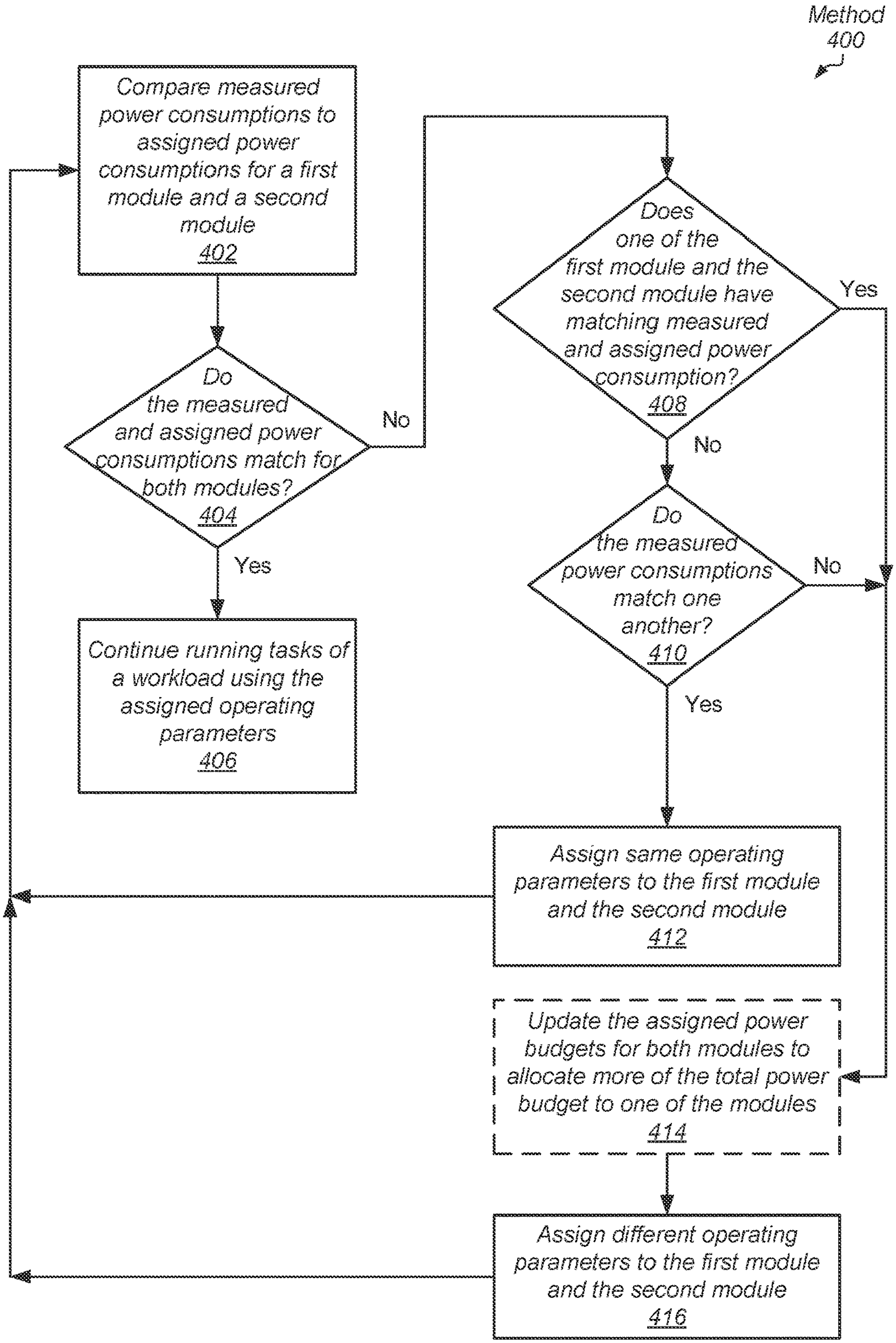
FIG. 4 is a generalized block diagram of a method for efficiently managing power consumption and performance among replicated modules of an integrated circuit.

Referring to FIG. 4, a generalized block diagram is shown of a method 400 for efficiently managing performance among replicated modules of an integrated circuit despite different circuit behavior due to manufacturing variations. A power manager of an integrated circuit compares measured power consumptions to assigned power consumptions for a first module and a second module (block 402). If the measured and assigned power consumptions match for both modules ("yes" branch of the conditional block 404), then the first module and the second module continue running tasks of a workload using the assigned operating parameters (block 406). However, if the measured and assigned power consumptions do not match for both modules ("no" branch of the conditional block 404), then circuitry of the power manager determines whether one of the first module and the second module have matching measured and assigned power consumption.

If the power manager determines one of the first module and the second module has matching measured and assigned power consumption ("yes" branch of the conditional block 408), then in some implementations, the power manager updates the assigned power budgets for both modules to allocate more of the total power budget to one of the modules (block 414). Then the power manager assigns different operating parameters to the first module and the second module (block 416). Afterward, control flow of method 400 returns to block 402 where the power manager compares measured power consumptions to assigned power consumptions for a first module and a second module.

If the power manager determines that neither one of the first module and the second module has matching measured and assigned power consumption ("no" branch of the conditional block 408), and the measured power consumptions do not match one another ("no" branch of the conditional block 410), then control flow of method 400 moves to block 414 where in some implementations, the power manager updates the assigned power budgets for both modules to allocate more of the total power budget to one of the modules.

However, if the measured power consumptions do match one another ("yes" branch of the conditional block 410), then the power manager assigns the same operating parameters to the first module and the second module (block 412). Afterward, control flow of method 400 returns to block 402 where the circuitry compares measured power consumptions to assigned power consumptions for a first module and a second module. In some implementations, after the total power budget is satisfied, the power manager (or another functional block) determines whether replicated modules (or replicated partitions in separate replicated modules) are providing performance levels within a performance threshold of one another when executing a same workload. In an implementation, the replicated modules (or replicated partitions in separate replicated modules) may process pixel rendering tasks of a same video graphics workload, where pixel rendering tasks are considered tasks of the same type. Performance levels can be measured using throughput, a measured rate of a number of instructions retired, or other metrics. If the performance levels vary by more than the performance threshold, then the power manger receives an indication (or determines the indication) to adjust the new operating parameters in a manner so that the performance levels of the modules fall within a performance threshold of one another. After a particular time interval (or period of time) elapses, the power consumption and the performance levels of the replicated modules (or replicated partitions in separate replicated modules) are checked again.

Figure 5:
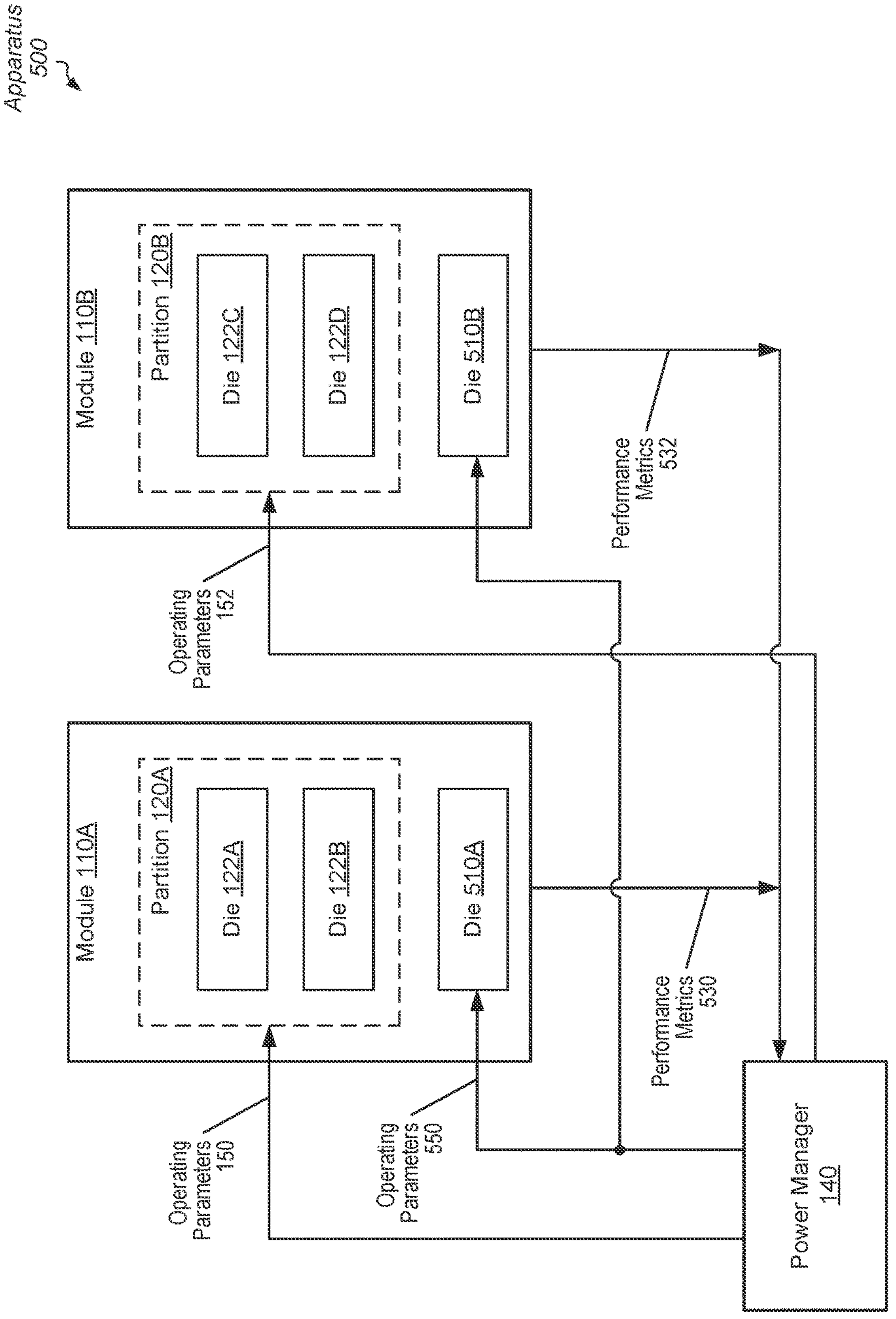
FIG. 5 is a generalized block diagram of an apparatus that manages power consumption and performance among replicated modules of an integrated circuit.

Referring to FIG. 5, a generalized block diagram is shown of an apparatus 500 that manages performance among replicated modules of an integrated circuit. Circuits and signals described earlier are numbered identically. In the illustrated implementation, the module 110A includes the additional die 510A, and the module 110B includes the additional die 510B. The module 510B is a copy (i.e., an instance) of the module 510A. Despite being placed in separate modules, dies 510A and 510B share a same power rail. Therefore, the power manager 140 assigns the same operating parameters 550 to each of the dies 510A and 510B. In some implementations, the dies 510A and 510B perform the functionality of a communication fabric for the modules 110A and 110B. However, in other implementations, the dies 510A and 510B perform any one of a variety of other functionalities for the modules 110A and 110B.

The performance metrics 530 and 532 monitored during the processing of a workload are similar to the performance metrics 130 and 132, which were described earlier. However, the performance metrics 530 and 532 include the circuit behavior of the dies 510A and 510B. In an example, the power manager 140 receives a power budget of 400 watts (W) for the apparatus 500. The power budget can also be represented as a number of power credits or other value. The power manager 140 initially assigns a same budget of 120 W to each of the partitions 120A and 120B, and assigns a budget of 80 W to each of the dies 510A and 510B. The power manager sends corresponding values for the operating parameters 150, 152 and 550.

After a time interval, the power manager 140 receives updated values of the performance metrics 530 and 532 in addition to an indication of the workload for the modules 110A and 110B. From the performance metrics 530 and 532, the power manager 140 determines each of the partitions 120A and 120B consumes 100 W instead of the assigned 120 W and the dies 510A-510B jointly consume 120 W instead of the jointly assigned 160 W. Based on the indication of the workload, the power manager 140 can either maintain the current values of the operating parameters 150, 152 and 550, or update them. After another time interval, the power manager 140 determines each of the partitions 120A and 120B consumes 110 W instead of the assigned 120 W and the dies 510A-510B jointly consume 140 W instead of the jointly assigned 160 W. Based on the indication of the workload, the power manager 140 can either maintain the current values of the operating parameters 150, 152 and 550, or update them.

After another time interval, the power manager 140 determines the partition 120A consumes 120 W, whereas, the partition 120B consumes 115 W. In addition, power manager 140 determines the dies 510A-510B jointly consume the assigned 160 W. Despite processing similar tasks of a same workload, the partition 120B consumes less power than the partition 120A. As described earlier, it is possible that the partition 120B has a minimum power supply voltage less than a minimum power supply voltage of the partition 120A. It is also possible that other parameter differences cause the partition 120B to consume less power than partition 120A. In response, the power manager assigns a power budget of 125 W to partition 120A and a power budget of 115 W to partition 120B. The power manager 140 sends values of operating parameters 150 and 152 corresponding to these new power budgets.

Figure 6:
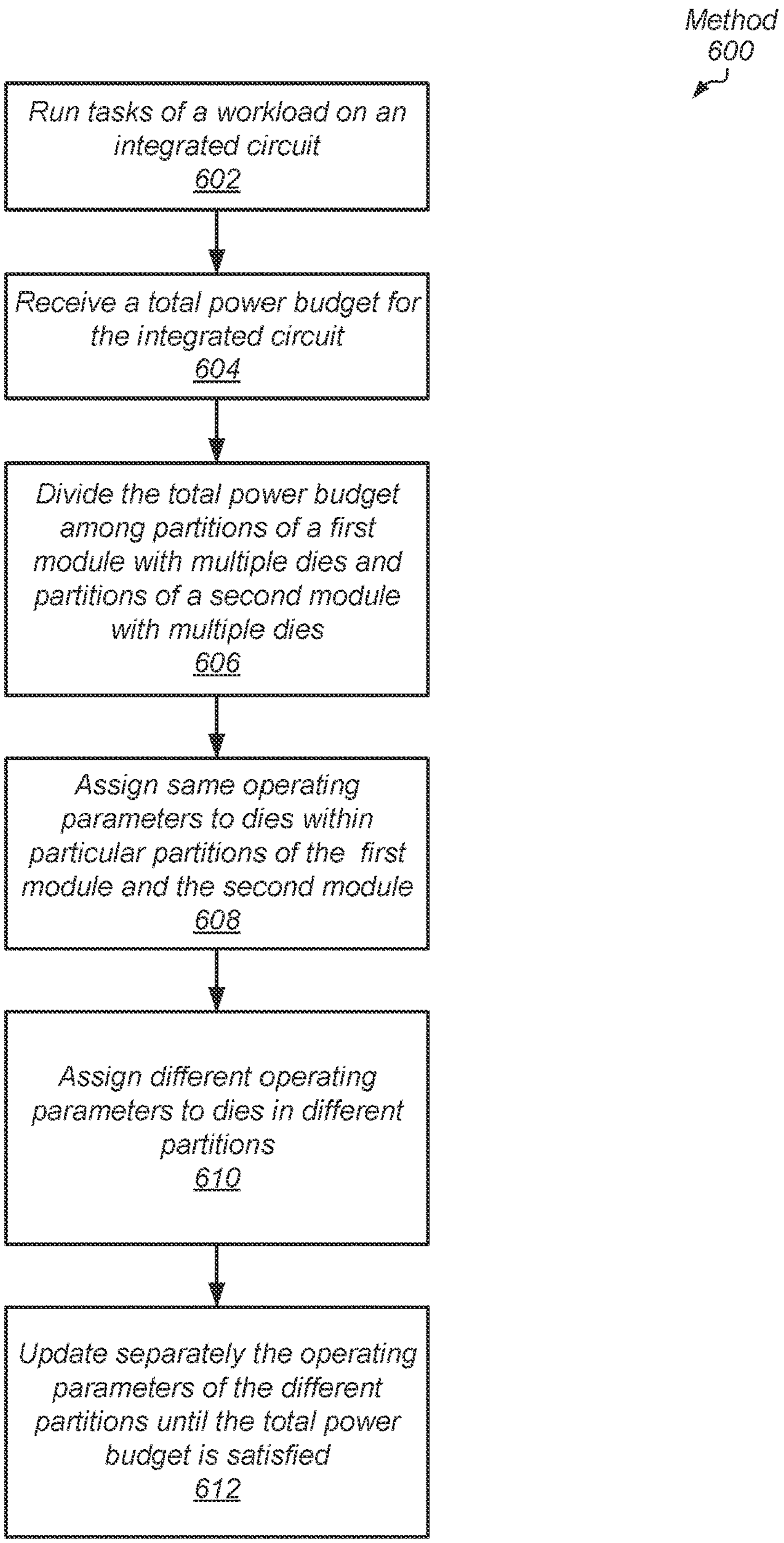
FIG. 6 is a generalized diagram of a method for efficiently managing power consumption and performance among replicated modules of an integrated circuit.

Turning now to FIG. 6, a generalized block diagram is shown of a method 600 for efficiently managing performance among replicated modules of an integrated circuit despite different circuit behavior due to manufacturing variations. An integrated circuit runs tasks of a workload (block 602). A power manager receives a total power budget for the integrated circuit (block 604). The power manager divides the total power budget among partitions of a first module with multiple dies and partitions of a second module with multiple dies (block 606). Dies within a same partition share at least a same power rail. The power manager assigns same operating parameters to dies within particular partitions of the first module and the second module (block 608). The power manager assigns different operating parameters to dies in different partitions (block 610).

The power manager updates the operating parameters of the different partitions until the total power budget is satisfied (block 612). However, the power manager updates together the operating parameters of the same partitions until the total power budget is satisfied. In some implementations, after the total power budget is satisfied, the power manager or another functional block determines whether replicated modules (or replicated partitions in separate replicated modules) are providing performance levels within a performance threshold of one another when a same workload is being assigned to the replicated modules (or replicated partitions in separate replicated modules). If the performance levels vary by more than the performance threshold, then the power manger receives an indication (or determines the indication) to adjust the new operating parameters in a manner to equate the separate performance levels. After a particular time interval elapses, the power consumption, and the performance levels of the replicated modules (or replicated partitions in separate replicated modules) are again checked.

Figure 7:
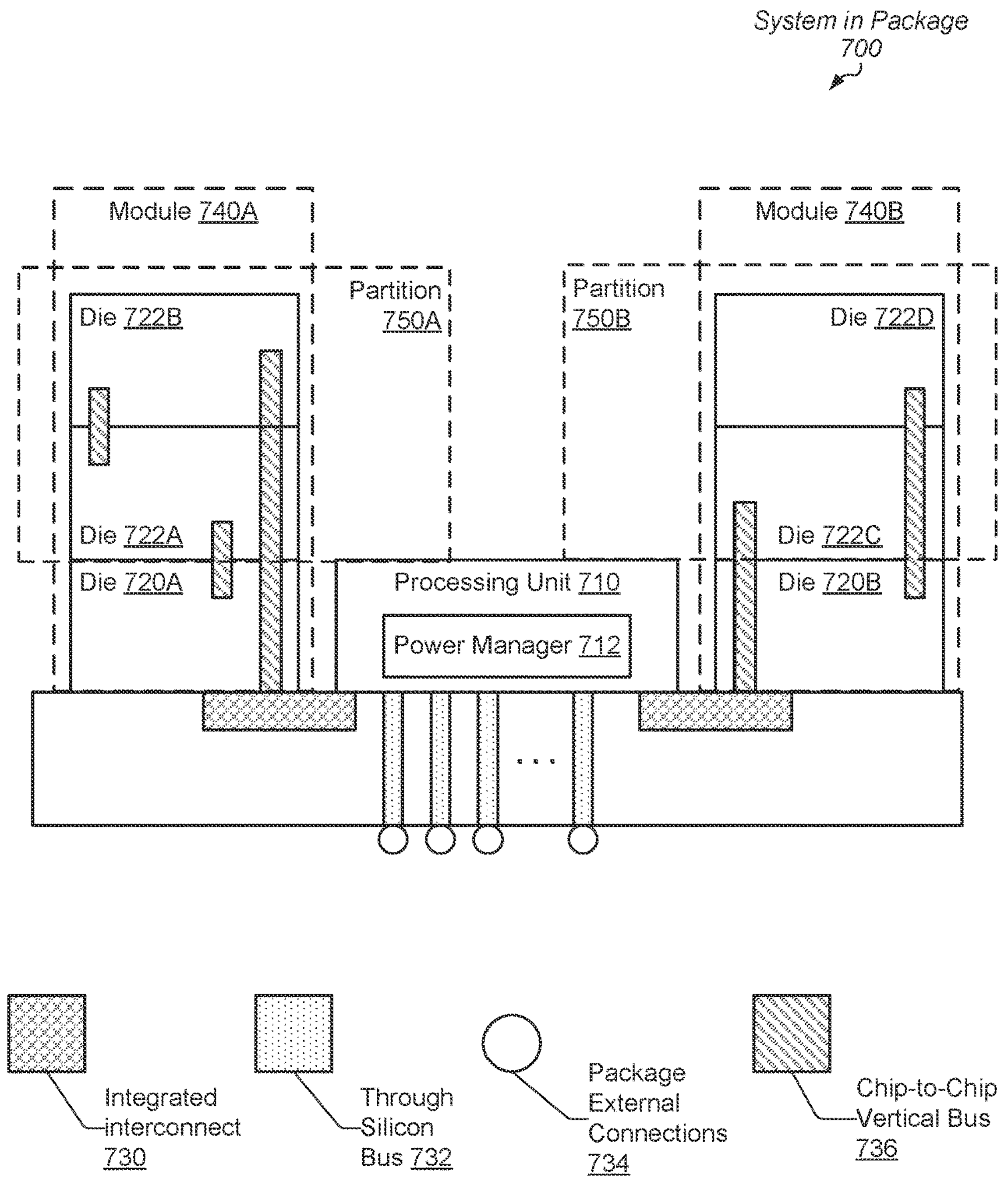
FIG. 7 is a generalized block diagram of a system-in-package (SiP) that manages power consumption and performance among replicated modules of an integrated circuit.

Turning now to FIG. 7, a generalized block diagram is shown of a system-in-package (SiP) 700 that manages performance among replicated modules of an integrated circuit despite different circuit behavior due to manufacturing variations. In various implementations, three-dimensional (3D) packaging is used within a computing system. This type of packaging is referred to as a System in Package (SiP). A SiP includes one or more three-dimensional integrated circuits (3D ICs). A 3D IC includes two or more layers of active electronic components integrated both vertically and/or horizontally into a single circuit. In one implementation, interposer-based integration is used whereby the 3D IC is placed next to the processing unit 710. Alternatively, a 3D IC is stacked directly on top of another IC.

Die-stacking technology is a fabrication process that enables the physical stacking of multiple separate pieces of silicon (integrated chips) together in a same package with high-bandwidth and low-latency interconnects. In some implementations, the die is stacked side by side on a silicon interposer, or vertically directly on top of each other. One configuration for the SiP is to stack one or more semiconductor dies (or dies) next to and/or on top of a processing unit such as processing unit 710. In an implementation, the SiP 700 includes the processing unit 710 and the modules 740A-740B. Module 740A includes the semiconductor die 720A and the multiple three-dimensional (3D) semiconductor dies 722A-722B within the partition 750A. Although two dies are shown, any number of dies is used as stacked 3D dies in other implementations.

In a similar manner, the module 740B includes the semiconductor die 720B and the multiple 3D semiconductor dies 722C-722D within the partition 750B. The dies 722A-722B within the partition 750A share at least a same power rail. The dies 722A-722B can also share a same clock signal. The dies 722C-722D within the partition 750B share at least a same power rail. The dies 722C-722D can also share a same clock signal. In some implementations, another module is placed adjacent to the left of module 740A that includes a die that is an instantiated copy of the die 720A. It is possible and contemplated that this other die and die 720A share at least a power rail. Therefore, the power manager 712 has the same functionality as the power manager 140 (of FIGS. 1 and 5).

Each of the modules 740A-740B communicates with the processing unit 710 through horizontal low-latency interconnect 730. In various implementations, the processing unit 710 is a general-purpose central processing unit; a graphics processing unit (GPU), an accelerated processing unit (APU), a field programmable gate array (FPGA), or other data processing device. The in-package horizontal low-latency interconnect 730 provides reduced lengths of interconnect signals versus long off-chip interconnects when a SiP is not used. The in-package horizontal low-latency interconnect 730 uses particular signals and protocols as if the chips, such as the processing unit 710 and the modules 740A-740B, were mounted in separate packages on a circuit board. In some implementations, the SiP 700 additionally includes backside vias or through-bulk silicon vias 732 that reach to package external connections 734. The package external connections 734 are used for input/output (I/O) signals and power signals.

In various implementations, multiple device layers are stacked on top of one another with direct vertical interconnects 736 tunneling through them. In various implementations, the vertical interconnects 736 are multiple through silicon vias grouped together to form through silicon buses (TSBs). The TSBs are used as a vertical electrical connection traversing through a silicon wafer. The TSBs are an alternative interconnect to wire-bond and flip chips. The size and density of the vertical interconnects 736 that can tunnel between the different device layers varies based on the underlying technology used to fabricate the 3D ICs.

As shown, some of the vertical interconnects 736 do not traverse through each of the modules 740A-740B. Therefore, in some implementations, the processing unit 710 does not have a direct connection to one or more dies such as die 722D in the illustrated implementation. Therefore, the routing of information relies on the other dies of the SiP 700.

Figure 8:
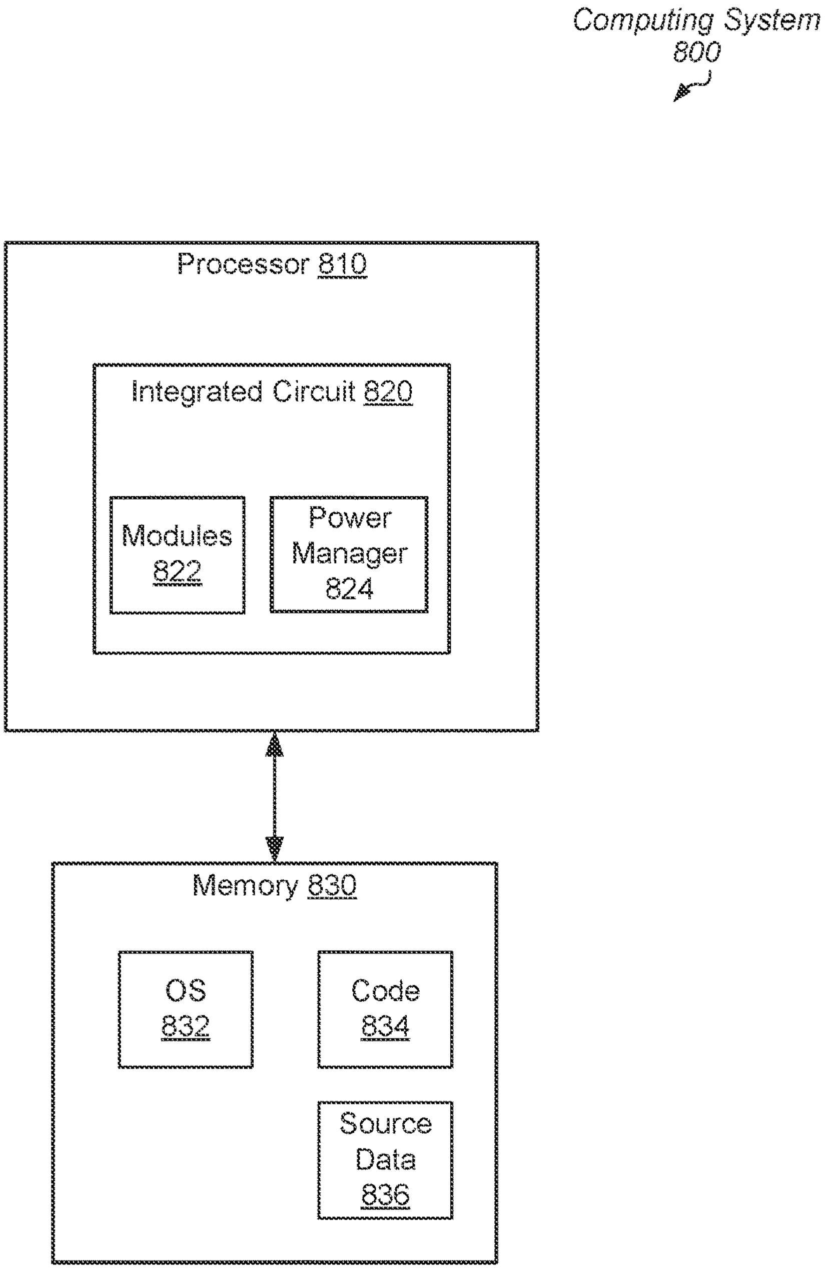
FIG. 8 is a generalized block diagram of a computing system that manages power consumption and performance among replicated modules of an integrated circuit.

Referring to FIG. 8, a generalized block diagram is shown of a computing system 800 that manages performance among replicated modules of an integrated circuit despite different circuit behavior due to manufacturing variations. The computing system 800 includes the processor 810 and the memory 830. Interfaces, such as a memory controller, a bus, or a communication fabric, one or more phased locked loops (PLLs) and other clock generation circuitry, a power management unit, and so forth, are not shown for ease of illustration. It is understood that in other implementations, the computing system 800 includes one or more of other processors of a same type or a different type than processor 810, one or more peripheral devices, a network interface, one or more other memory devices, and so forth. In some implementations, the functionality of the computing system 800 is incorporated on a system on chip (SoC). In other implementations, the functionality of the computing system

800 is incorporated on a peripheral card inserted in a motherboard. The computing system 800 is used in any of a variety of computing devices such as a desktop computer, a tablet computer, a laptop, a smartphone, a smartwatch, a gaming console, a personal assistant device, and so forth.

The processor 810 includes hardware such as circuitry. For example, the processor 810 includes at least one integrated circuit 820. The integrated circuit 820 modules 822 where one or more of these modules 822 include one or more partitions and one or more dies similar to the modules 110A-110B of apparatus 100 and apparatus 500 (of FIGS. 1 and 5). The power manager 824 has the same functionality as the power manager 140 (of FIGS. 1 and 5) and power manager 712 (of FIG. 7). In some implementations, the processor 810 includes one or more processing units. In some implementations, each of the processing units includes one or more processor cores capable of general-purpose data processing, and an associated cache memory subsystem. In such an implementation, the processor 810 is a central processing unit (CPU). In another implementation, the processing cores are compute units, each with a highly parallel data microarchitecture with multiple parallel execution lanes and an associated data storage buffer. In such an implementation, the processor 810 is a graphics processing unit (GPU), a digital signal processor (DSP), or other.

In some implementations, the memory 830 includes one or more of a hard disk drive, a solid-state disk, other types of flash memory, a portable solid-state drive, a tape drive and so on. The memory 830 stores an operating system (OS) 832, one or more applications represented by code 834, and at least source data 836. Memory 830 is also capable of storing intermediate result data and final result data generated by the processor 810 when executing a particular application of code 834. Although a single operating system 832 and a single instance of code 834 and source data 836 are shown, in other implementations, another number of these software components are stored in memory 830. The operating system 832 includes instructions for initiating the boot up of the processor 810, assigning tasks to hardware circuitry, managing resources of the computing system 800 and hosting one or more virtual environments.

Each of the processor 810 and the memory 830 includes an interface unit for communicating with one another as well as any other hardware components included in the computing system 800. The interface units include queues for servicing memory requests and memory responses, and control circuitry for communicating with one another based on particular communication protocols. The communication protocols determine a variety of parameters such as supply voltage levels, power-performance states that determine an operating supply voltage and an operating clock frequency, a data rate, one or more burst modes, and so on.

Figure 9:
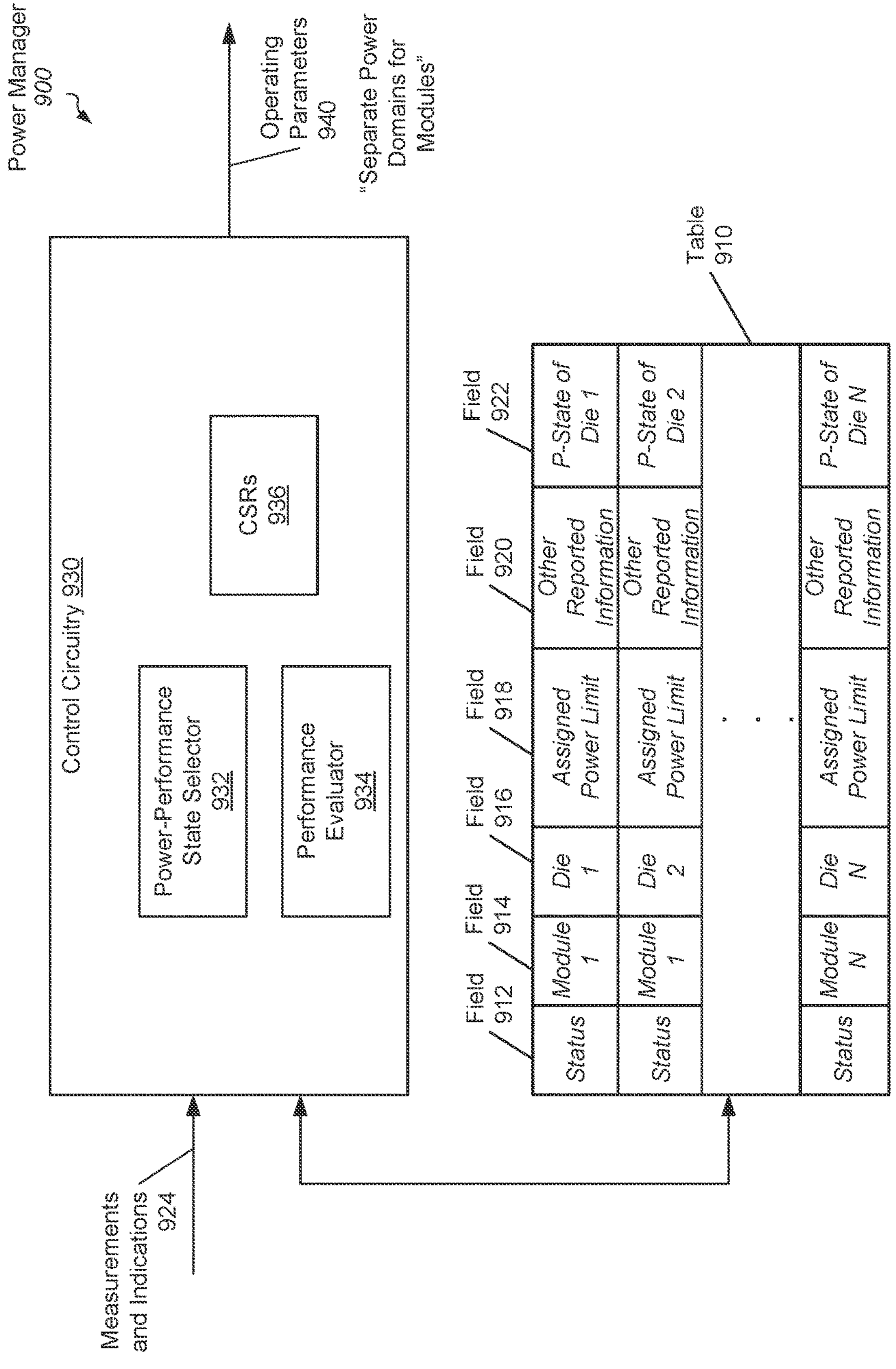
FIG. 9 is a generalized block diagram of a power manager that manages power consumption and performance among replicated modules of an integrated circuit.

Turning now to FIG. 9, a generalized block diagram is shown of a power manager 900 that manages power consumption and performance among replicated modules of an integrated circuit despite manufacturing variations across semiconductor dies. As shown, the power manager 900 includes the table 910 and the control circuitry 930. The control circuitry 930 includes multiple components 932-936 that are used to generate the operating parameters 940 to update separate power domains of replicated modules. The table 910 includes multiple table entries (or entries), each storing information in multiple fields such as at least fields 912-922. In some implementations, one or more of the components of power manager 900 and corresponding functionality is provided in another external circuit, rather than provided here in power manager 900. The functionality provided by the power manager 900 is also provided in the power manager 140 (of FIGS. 1 and 5), the power manager 712 (of FIG. 7), and the power manager 824 (of FIG. 8).

The table 910 is implemented with one of flip-flop circuits, a random-access memory (RAM), a content addressable memory (CAM), or other. Although particular information is shown as being stored in the fields 912-922 and in a particular contiguous order, in other implementations, a different order is used and a different number and type of information is stored. As shown, field 912 stores status information such as at least a valid bit. Field 914 stores an identifier that specifies one of the multiple replicated modules. Field 916 stores an identifier that specifies one of the multiple dies within a particular module.

The field 918 stores a currently assigned power limit for the identified module. The assigned power limits are one of values represented in units of watts, values representative of a number of power credits, values represented in counts, and so forth. In other implementations, the field 918 also stores, in addition to the assigned power limit, an indication of a limit for a corresponding partition on one or more of an operating power supply voltage and an operating clock frequency. In some implementations, field 920 stores an indication of an activity level, and one or more calculated values of the power consumption measurement or an average of the calculated values of the power consumption measurement. The field 922 stores operating parameters of a particular power-performance state (P-state) currently used by the corresponding die such as at least an operating power supply voltage and an operating clock frequency.

The control circuitry 930 receives usage measurements and indications 924, which represent at least activity levels of the modules and power consumption measurements or parameters used to determine recent power consumption values of the modules. The measurements 924 can also include measured temperature values from analog or digital thermal sensors placed throughout the dies of the modules. The control circuitry 930 is also able to update information stored in the table 910 such as at least the updated assigned power limits stored in field 918.

The power-performance state (P-state) selector 932 calculates the assigned power limits and corresponding P-state from the received information 924 and information stored in the table 910. The P-state selector 932 selects the next operating parameters to use for the modules, and adjusts the assigned power limits for each one of the multiple modules over time. In some implementations, the P-state selector 932 is capable of updating the multiple assigned power limits for the multiple modules within a first time interval (or a first period of time) such as every one or more milliseconds. When this time interval has passed, in some implementations, the performance evaluator 934 determines whether replicated partitions (or replicated partitions in separate replicated modules) are providing performance levels within a threshold of one another. In other implementations, the performance evaluator 934 performs this check after a total power budget is satisfied, rather than when a particular time interval has elapsed. Based on the measurements and indications 924, the performance evaluator 934 determines performance levels of modules as a measured throughput, a measured rate of a number of instructions retired, and so on.

If the performance evaluator 934 determines the replicated partitions (or replicated partitions in separate replicated modules) do not provide performance levels within a threshold of one another, then the performance evaluator 934 sends an indication to the P-state selector 932 to adjust the new operating parameters in a manner to equate the separate performance levels. After a particular time interval elapses, the power consumption and the performance levels of the replicated partitions (or replicated partitions in separate replicated modules) are again checked. One or more components of the power manager 900 use values stored in the configuration and status registers (CSRs) 936. The CSRs 936 store values such as a total power budget for multiple modules, a performance threshold, a power consumption difference threshold between modules, and so forth.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:

circuitry configured to:

allocate a first portion of a power budget to a first module and a second portion of the power budget to a second module, wherein the first module and the second module are separate instantiated copies of a same integrated circuitry design; and modify at least one of the first portion and the second portion, responsive to a first difference between a performance level of the first module and a performance level of the second module during execution of a same type of task, to cause the first module and the second module to operate at performance levels having a second difference smaller than the first difference, wherein the performance level of the first module and the performance level of the second module are determined based on received hardware performance metrics for the respective first and second modules.

2. The integrated circuit as recited in claim 1, wherein the hardware performance metrics are based on performance counters in the first module and the second module.

3. The integrated circuit as recited in claim 1, wherein the hardware performance metrics comprise one or more of a rate of instructions retired, a rate of instructions issued, and a rate of cache hits.

4. The integrated circuit as recited in claim 1, wherein the first module and the second module are in different power domains.

5. The integrated circuit as recited in claim 4, wherein the circuitry is further configured to initially allocate the power budget such that the first portion is equal to the second portion.

6. The integrated circuit as recited in claim 4, wherein the circuitry is further configured to reallocate the power budget between the first module and the second module, in further response to a given time interval has elapsed.

7. The integrated circuit as recited in claim 1, wherein, responsive to a determination that a measured power consumption of at least one of the first module and the second module differs from its corresponding allocated portion of the power budget, the circuitry is configured to update the first portion and the second portion by reallocating at least a part of unused power budget from one of the first module and the second module to the other.

8. A method comprising:

allocating, by power management circuitry, a first portion of a power budget to a first module and a second portion of the power budget to a second module, wherein the first module and the second module are separate instantiated copies of a same integrated circuitry design; and modifying, by the power management circuitry, at least one of the first portion and the second portion, responsive to a first difference between a performance level of the first module and a performance level of the second module during execution of a same type of task, to cause the first module and the second module to operate at performance levels having a second difference smaller than the first difference, wherein the performance level of the first module and the performance level of the second module are determined based on received hardware performance metrics for the respective first and second modules.

9. The method as recited in claim 8, wherein the hardware performance metrics are based on performance counters in the first module and the second module.

10. The method as recited in claim 8, wherein the hardware performance metrics comprise one or more of a rate of instructions retired, a rate of instructions issued, and a rate of cache hits.

11. The method as recited in claim 8, wherein the first module and the second module are in different power domains.

12. The method as recited in claim 11, further comprising initially allocating, by the power management circuitry, the power budget such that the first portion is equal to the second portion.

13. The method as recited in claim 11, further comprising reallocating, by the power management circuitry, the power budget between the first module and the second module, in further response to a given time interval has elapsed.

14. The method as recited in claim 8, wherein, responsive to a determination that a measured power consumption of at least one of the first module and the second module differs from its corresponding allocated portion of the power budget, the method comprises updating the first portion and the second portion by reallocating at least a part of unused power budget from one of the first module and the second module to the other.

15. A computing system comprising:

a first module and a second module, wherein the first module and the second module are instances of integrated circuitry; and a power manager comprising circuitry configured to:

allocate a first portion of a power budget to a first module and a second portion of the power budget to a second module, wherein the first module and the second module are separate instantiated copies of a same integrated circuitry design; and modify at least one of the first portion and the second portion, responsive to a first difference between a performance level of the first module and a performance level of the second module during execution of a same type of task, to cause the first module and the second module to operate at performance levels having a second difference smaller than the first difference, wherein the performance level of the first module and the performance level of the second module are determined based on received hardware performance metrics for the respective first and second modules.

16. The computing system as recited in claim 15, wherein the hardware performance metrics are based on performance counters in the first module and the second module.

17. The computing system as recited in claim 15, wherein the hardware performance metrics comprise one or more of a rate of instructions retired, a rate of instructions issued, and a rate of cache hits.

18. The computing system as recited in claim 15, wherein the first module and the second module are in different power domains.

19. The computing system as recited in claim 18, wherein the power manager is further configured to initially allocate the power budget such that the first portion is equal to the second portion.

20. The computing system as recited in claim 15, wherein, responsive to a determination that a measured power consumption of at least one of the first module and the second module differs from its corresponding allocated portion of the power budget, the power manager is configured to update the first portion and the second portion by reallocating at least a part of unused power budget from one of the first module and the second module to the other.

* * * * *